(12) United States Patent
Park et al.

(10) Patent No.: US 12,074,270 B2
(45) Date of Patent: Aug. 27, 2024

(54) SECONDARY BATTERY

(71) Applicant: Samsung SDI Co., Ltd., Yongin-si (KR)

(72) Inventors: Jung Hyun Park, Yongin-si (KR); Hyun Ki Jeong, Yongin-si (KR); Nobuyuki Oyagi, Yongin-si (KR); Won Ik Lee, Yongin-si (KR); Young Chang Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 533 days.

(21) Appl. No.: 17/283,240

(22) PCT Filed: Sep. 24, 2019

(86) PCT No.: PCT/KR2019/012398
§ 371 (c)(1),
(2) Date: Apr. 6, 2021

(87) PCT Pub. No.: WO2020/075990
PCT Pub. Date: Apr. 16, 2020

(65) Prior Publication Data
US 2021/0344033 A1 Nov. 4, 2021

(30) Foreign Application Priority Data
Oct. 12, 2018 (KR) .................. 10-2018-0121940

(51) Int. Cl.
*H01M 10/04* (2006.01)
*H01M 4/134* (2010.01)
(Continued)

(52) U.S. Cl.
CPC ....... *H01M 10/0431* (2013.01); *H01M 4/134* (2013.01); *H01M 10/0422* (2013.01);
(Continued)

(58) Field of Classification Search
None
See application file for complete search history.

(56) References Cited

U.S. PATENT DOCUMENTS

| | | | |
|---|---|---|---|
| 6,335,114 B1 * | 1/2002 | Ueshima | H01M 4/0416 |
| | | | 429/162 |
| 6,569,565 B2 | 5/2003 | Ligeois et al. | |

(Continued)

FOREIGN PATENT DOCUMENTS

| | | |
|---|---|---|
| CN | 108475756 A | 8/2018 |
| DE | 112013001165 T5 | 11/2014 |

(Continued)

OTHER PUBLICATIONS

Machine translation of JP 11-219694, published on Aug. 10, 1999 (Year: 1999).*

(Continued)

*Primary Examiner* — Anca Eoff
(74) *Attorney, Agent, or Firm* — Lewis Roca Rothgerber Christie LLP

(57) ABSTRACT

An embodiment of the present invention relates to a secondary battery, and with respect to a technical problem to be resolved, provided is a secondary battery which has an electrode tab provided by forming a notch on a non-coated part of an electrode plate of an electrode assembly, and which can enable a current collecting plate to come into surface contact with the electrode tab. To this end, disclosed is a secondary battery comprising: an electrode assembly which comprises a first electrode plate coated with a first electrode active material and having a first non-coated part formed along an upper end thereof, a second electrode plate coated with a second electrode active material and having a second non-coated part formed along a lower end thereof, and a separator interposed between the first electrode plate and the second electrode plate, and which is wound in a jelly (Continued)

roll shape; a can for accommodating the electrode assembly; a cap assembly for sealing the can; a first current collecting plate electrically connected to the cap assembly by coming into contact with the first non-coated part; and a second current collecting plate electrically connected to the can by coming into contact with the second non-coated part, wherein the first non-coated part and/or the second non-coated part has a structure in which a plurality of isosceles trapezoidal electrode tabs are arranged to be adjacent to one another with notches formed at a specific angle ($\alpha$) and at predetermined intervals from a start point thereof that is closest to a winding axis, and thus the first non-coated part and/or the second non-coated part are bent toward the winding axis.

16 Claims, 3 Drawing Sheets

(51) Int. Cl.
*H01M 50/531* (2021.01)
*H01M 50/533* (2021.01)
*H01M 50/538* (2021.01)

(52) U.S. Cl.
CPC ....... *H01M 50/531* (2021.01); *H01M 50/533* (2021.01); *H01M 50/538* (2021.01)

(56) References Cited

U.S. PATENT DOCUMENTS

| | | | |
|---|---|---|---|
| 8,795,864 | B2 | 8/2014 | Ahn |
| 9,825,324 | B2 | 11/2017 | Jung et al. |
| 9,929,393 | B2 | 3/2018 | Shiu et al. |
| 9,979,044 | B2 | 5/2018 | Minagata |
| 10,355,262 | B2 | 7/2019 | Kang et al. |
| 10,784,483 | B2 | 9/2020 | Han et al. |
| 11,075,374 | B2 | 7/2021 | Mino |
| 2001/0023038 | A1 | 9/2001 | Ligeois et al. |
| 2004/0253512 | A1* | 12/2004 | Watanabe ............. H01M 4/131 429/185 |
| 2005/0287432 | A1 | 12/2005 | Cheon et al. |
| 2007/0020518 | A1* | 1/2007 | Bito ................... H01M 50/536 29/623.2 |
| 2007/0298317 | A1 | 12/2007 | Brodd et al. |
| 2010/0247989 | A1 | 9/2010 | Kim |
| 2013/0059183 | A1 | 3/2013 | Ahn |
| 2015/0017517 | A1 | 1/2015 | Minagata |
| 2015/0243453 | A1 | 8/2015 | Taguchi |
| 2015/0372335 | A1 | 12/2015 | Jung et al. |
| 2016/0133912 | A1 | 5/2016 | Chong |
| 2016/0141589 | A1 | 5/2016 | Kang et al. |
| 2017/0092925 | A1 | 3/2017 | Shiu et al. |
| 2017/0125764 | A1 | 5/2017 | Han et al. |
| 2018/0013120 | A1 | 1/2018 | Drings |
| 2018/0269457 | A1 | 9/2018 | Kawate et al. |
| 2018/0358608 | A1 | 12/2018 | Mino |

FOREIGN PATENT DOCUMENTS

| | | | |
|---|---|---|---|
| JP | 11-219694 | * | 8/1999 |
| JP | 2000-348757 A | | 12/2000 |
| JP | 2001-297745 A | | 10/2001 |
| JP | 2011100674 A | | 5/2011 |
| KR | 10-2005-0121904 A | | 12/2005 |
| KR | 1020050121914 A | | 12/2005 |
| KR | 10-1320392 B1 | | 10/2013 |
| KR | 10-20140091222 A | | 7/2014 |
| KR | 10-2016-0059748 A | | 5/2016 |
| KR | 10-2016-0092748 A | | 8/2016 |
| KR | 10-1674264 B1 | | 11/2016 |
| KR | 10-2017-0023595 A | | 3/2017 |
| KR | 1020170038672 A | | 4/2017 |
| KR | 10-2017-0049275 A | | 5/2017 |
| KR | 10-2018-0000223 A | | 1/2018 |
| KR | 10-20180106367 A | | 10/2018 |

OTHER PUBLICATIONS

EPO Extended European Search Report dated Aug. 12, 2022, issued in corresponding European Patent Application No. 19871668.0 (6 pages).
Korean Office Action dated Sep. 1, 2023, issued in corresponding Korean Patent Application No. 10-2018-0121940, 4 pages.
International Search Report dated Jan. 6, 2020, for corresponding PCT/KR2019/012398, 5 pages.
Chinese Notification of the First Office Action for Patent Application No. 201980076767.3, dated Nov. 29, 2023, 16 pages.
Korean Office Action dated Jun. 26, 2024, issued in corresponding Korean Patent Application No. 10-2018-0121940, 7 pages.

* cited by examiner

SECONDARY BATTERY

CROSS-REFERENCE TO RELATED APPLICATION(S)

This application is a U.S. National Phase Patent Application of International Application Number PCT/KR2019/012398, filed on Sep. 24, 2019, which claims priority of Korean Patent Application Number 10-2018-0121940, filed on Oct. 12, 2018, the entire content of each of which is incorporated herein by reference.

TECHNICAL FIELD

An embodiment of the present invention relates to a secondary battery.

BACKGROUND ART

A secondary battery is repeatedly charged and discharged, and in general, a low capacity secondary battery may be used for conveniently portable electronic devices, such as cellular phones, notebook computers, or camcorders, and a high capacity secondary battery may be used for electric vehicles, etc.

The secondary battery generally includes an electrode assembly, a can accommodating the electrode assembly and an electrolyte, and a cap assembly sealing the can. Here, the electrode assembly includes a positive electrode plate, a negative electrode plate, and a separator interposed between the positive electrode plate and the negative electrode plate, and is wound in a so-called jelly roll type. The positive electrode plate is electrically connected to the cap assembly, and the negative electrode plate is electrically connected to a bottom of the can, and to this end, a positive electrode current collecting plate and the negative electrode current collecting plate are welded to non-coated parts of the positive electrode plate and the negative electrode plate, respectively.

The above information disclosed in this Background section is only for enhancement of understanding of the background of the invention and therefore it may contain information that does not form the prior art that is already known to a person of ordinary skill in the art.

DESCRIPTION OF EMBODIMENTS

Technical Problem

An embodiment of the present invention provides a secondary battery in which an electrode tab is provided by forming a notch at a non-coated part of an electrode plate of an electrode assembly, and a current collecting plate can closely come into surface contact with the electrode tab.

In addition, the present invention provides a secondary battery which can secure the stability of an electrode plate when an electrode tab is bent and pressed.

Solution to Problem

A secondary battery according to an embodiment of the present invention comprises: an electrode assembly which comprises a first electrode plate coated with a first electrode active material and having a first non-coated part formed along an upper end thereof, a second electrode plate coated with a second electrode active material and having a second non-coated part formed along a lower end thereof, and a separator interposed between the first electrode plate and the second electrode plate, and which is wound in a jelly roll shape; a can for accommodating the electrode assembly; a cap assembly for sealing the can; a first current collecting plate electrically connected to the cap assembly and coming into contact with the first non-coated part; and a second current collecting plate electrically connected to the can and coming into contact with the second non-coated part, wherein the first non-coated part and/or the second non-coated part has a structure in which a plurality of isosceles trapezoidal electrode tabs are arranged to be adjacent to one another with notches formed at a specific angle (a) and at predetermined intervals from a start point thereof that is closest to a winding axis, and thus the first non-coated part and/or the second non-coated part are bent toward the winding axis.

In addition, a distance ($c_n$) between a point at which an nth notch is formed and a start point may satisfy the following equation:

$$c_n = r_0 n\alpha + t/4\pi(n\alpha)^2$$

wherein $r_0$ is a radius of the start point around the winding axis, and t is an increment of the radius when winding by 360° is performed.

In addition, a length ($l_n$) of the base of the nth electrode tab from the start point may satisfy the following equation:

$$l_n = r_0\alpha + \frac{t\alpha^2}{4\pi}(2n-1)$$

wherein $r_0$ is a radius of the start point around the winding axis, and t is an increment of the radius when winding by 360° is performed.

In addition, an insulation layer may be provided in at least one of regions between a part where the first electrode active material is coated and the first non-coated part, and between a part where the second electrode active material is coated and the second non-coated part.

In addition, the insulation layer may be formed to have a uniform width along a longitudinal direction.

Advantageous Effects of Invention

An embodiment of the present invention provides a secondary battery in which an electrode tab is provided by forming a notch on a non-coated part of an electrode plate of an electrode assembly, and a V-shaped notch having a specific angle is formed at a predetermined interval from a start point of the non-coated part, and thus the electrode tab can be made flat while having an area substantially corresponding to a top surface of the electrode assembly when the electrode tab is bent toward a winding axis, thereby enabling a current collecting plate to closely come into surface contact with the electrode tab. Therefore, the secondary battery may have generally uniform welding strength and resistance.

In addition, the present invention provides a secondary battery in which an insulation layer is formed in a region of an electrode plate between a part where an electrode active material is coated and the non-coated part so as to support the electrode tab thereunder, thereby preventing the electrode plate from improperly deformed when the electrode tab (the non-coated part) is bent and pressed, and further preventing a short circuit.

MODE OF INVENTION

Figure 1:
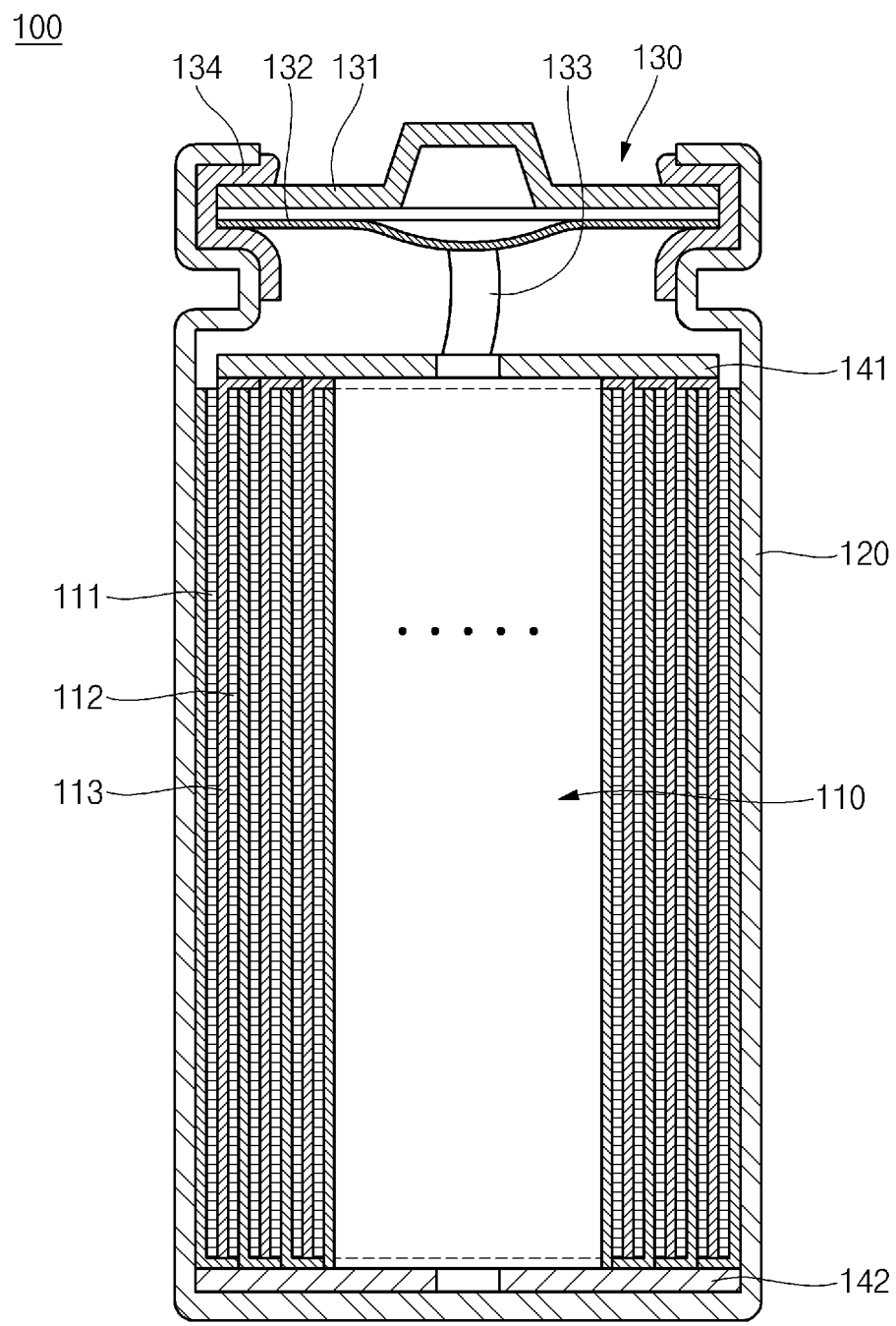
FIG. 1 is a cross-sectional view of a secondary battery according to an embodiment of the present invention.

Hereinafter, embodiments of the present invention will be described in detail.

The subject matter of the present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. In addition, it will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

FIG. 1 is a cross-sectional view of a secondary battery 100 according to an embodiment of the present invention.

Referring to FIG. 1, the secondary battery 100 includes an electrode assembly 110, a can 120, a cap assembly 130, a first current collecting plate 141, and a second current collecting plate 142.

The electrode assembly 110 includes a first electrode plate 111, a second electrode plate 112, and a separator 113, and is wound in a so-called jelly-roll shape.

The first electrode plate 111 may be a positive electrode plate. In this case, the first electrode plate 111 may be made of, for example, an aluminum foil, and a first electrode active material 111a may be coated thereon. Here, the first electrode active material 111a may include, for example, a transition metal oxide, and may be coated over a remaining region, except for an end of the first electrode plate 111. For example, the first electrode active material 111a may be applied to the remaining region, except for an upper end of the first electrode plate 111. In other words, a portion where the first electrode active material 111a is not coated, that is, a first non-coated part 111b, may be formed along the upper end of the first electrode plate 111.

In addition, the second electrode plate 112 may be a negative electrode plate. In this case, the second electrode plate 112 may be made of, for example, a copper or nickel foil, and a second electrode active material may be coated thereon. Here, the second electrode active material may include, for example, graphite or carbon, and may be coated over a remaining region, except for the other end of the second electrode plate 112. For example, the second electrode active material may be applied to the remaining region, except for a lower end of the second electrode plate 112. In other words, a portion where the second electrode active material is not coated, that is, a second non-coated part, may be formed along the lower end of the second electrode plate 112.

Of course, in some cases, the first electrode plate 111 may be a negative electrode plate and the second electrode plate 112 may be a positive electrode plate.

At least one of the first non-coated part 111b of the first electrode plate 111 and the second non-coated part of the second electrode plate 112 (in the present embodiment, both of the first non-coated part 111b and the second non-coated part), may have a V-shaped notch having a specific angle formed at every predetermined position along the longitudinal direction of a corresponding electrode plate, thereby providing an electrode tab. Therefore, the first non-coated part 111b and the second non-coated part are configured such that a plurality of isosceles trapezoidal electrode tabs are arranged in parallel so as to be adjacent to one another with notches formed at a specific angle (α) and at predetermined intervals, which will later be described in further detail.

The separator 113 may be made of polyethylene, polypropylene, or a composite film of polyethylene and polypropylene, and may be positioned between the first electrode plate 111 and the second electrode plate 112. The separator 113 may prevent a short circuit between the first electrode plate 111 and the second electrode plate 112 while allowing movement of lithium ions.

The can 120 is generally formed to have a shape of a cylinder having an open top surface and accommodates the electrode assembly 110 and an electrolyte.

The cap assembly 130 is coupled to a top end of the can 120 and seals the can 120.

In addition, the cap assembly 130 include a cap plate 131, a safety vent 132, an electrode lead 133, and a gasket 134.

The cap plate 131 includes an upwardly protruding terminal portion, and has a hole for discharging gas around the terminal portion.

The safety vent 132 may be spontaneously ruptured when an internal pressure exceeds a specific pressure by the gas generated in the secondary battery due to overcharge or other abnormal situations, thereby preventing explosion of the secondary battery by discharging the internal gas.

The electrode lead 133 allows the first electrode plate 111 of the electrode assembly 110 and the cap plate 131 to be electrically connected to each other through the first current collecting plate 141, which will later be described.

The gasket 134 surrounds the cap plate 131 and the safety vent 132 and insulates the cap plate 131 and the safety vent 132 from the can 120.

The first current collecting plate 141 is welded to the first non-coated part 111$b$ of the first electrode plate 111 and is electrically connected to the electrode lead 133 of the cap assembly 130.

In addition, the second current collecting plate 142 is welded to the second non-coated part of the second electrode plate 112 and is electrically connected to the bottom of the can 120.

Therefore, as stated above, if the first electrode plate 111 is a positive electrode plate and the second electrode plate 112 is a negative electrode plate, the cap plate 131 may have a positive polarity and the can 120 may have a negative polarity.

Figure 2:
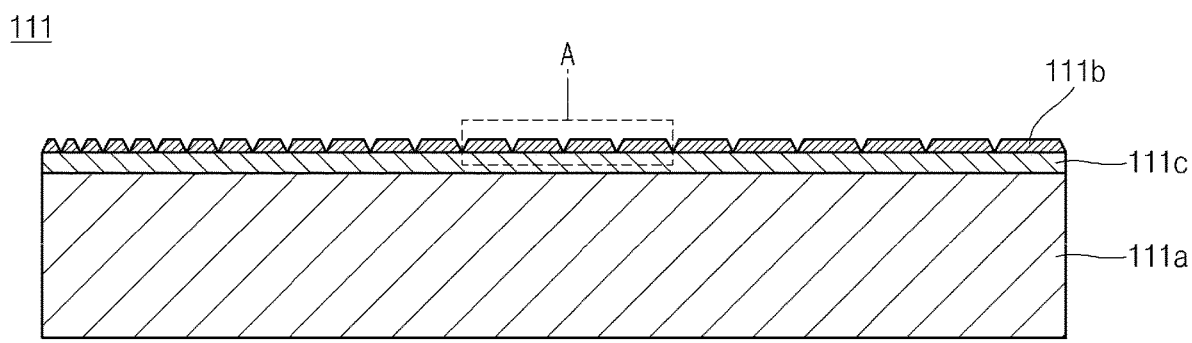
FIG. 2 is a front view of a first electrode plate of an electrode assembly of the secondary battery according to an embodiment of the present invention, sequentially showing a state in which the electrode assembly is not wound.
Figure 3:
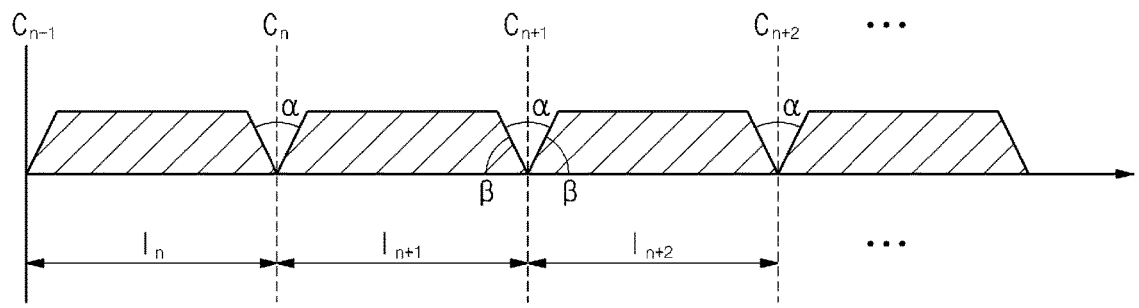
FIG. 3 is an enlarged view of a portion A of FIG. 2.

FIG. 2 is a front view of a first electrode plate 111 of an electrode assembly 110 of the secondary battery 100 according to an embodiment of the present invention, sequentially showing a state in which the electrode assembly is not wound. FIG. 3 is an enlarged view of a portion A of FIG. 2.

Figure 4:
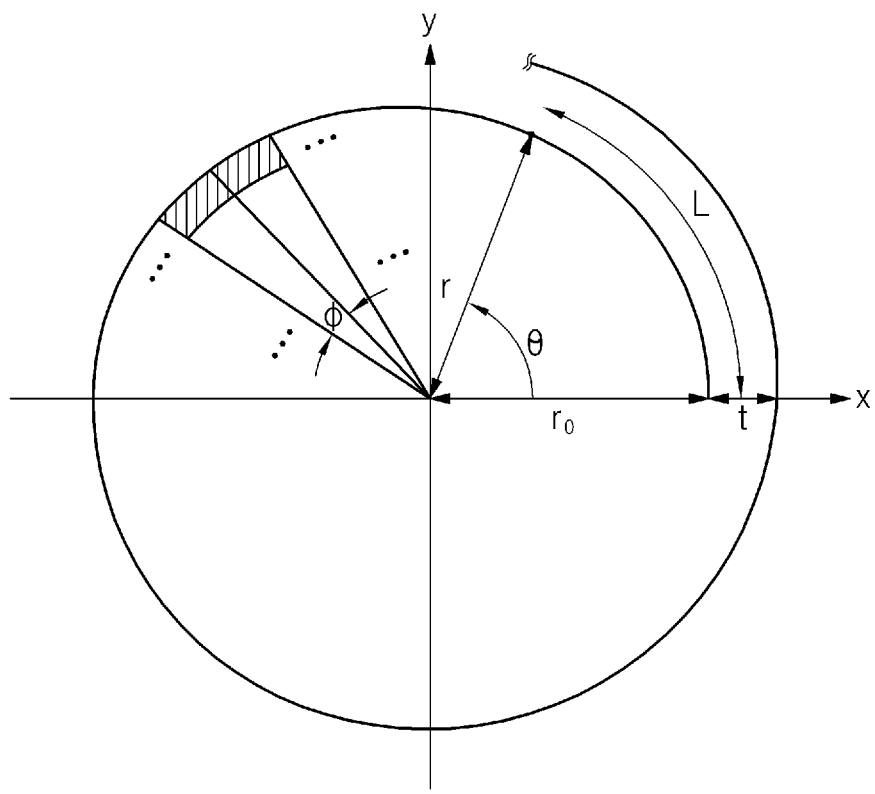
FIG. 4 is a plane view of the first electrode plate of an electrode assembly of the secondary battery according to an embodiment of the present invention, sequentially showing a state in which the electrode assembly is wound and an electrode tab is bent.

FIG. 4 is a plane view of the first electrode plate 111 of an electrode assembly 110 of the secondary battery 100 according to an embodiment of the present invention, sequentially showing a state in which the electrode assembly 110 is wound and an electrode tab is bent. For reference, the electrode tab is indicated as a shaded portion.

First, referring to FIGS. 2 and 3, as stated above, the first non-coated part 111$b$ has a structure in which notches having a specific angle ($\alpha$) are formed at every predetermined position along the longitudinal direction of the first electrode plate 111, so that the plurality of isosceles trapezoidal electrode tabs are continuously arranged in parallel so as to be adjacent to one another.

More specifically, referring to FIGS. 2 and 3 together with FIG. 4, when the first electrode plate 111 is wound by $\theta$[rad], the radius ($r$) of an arbitrary point on the first electrode plate 111 around the winding axis satisfies Equation 1 below:

$$r = r_0 + \frac{t}{2\pi}\theta \qquad \text{[Equation 1]}$$

wherein $r_0$ is a radius of a point of the first electrode plate 111, which is closest to the winding axis (hereinafter, referred to as a "start point").

In addition, t is an increment of the radius when the first electrode plate 111 is wound by 360°, and may be a constant determined by thicknesses of the first electrode plate 111, the second electrode plate 112 and the separator 113.

If Equation 1 is integrated with respect to $\theta$, when the first electrode plate 111 is wound by $\theta$, a length L of the arc between the start point and an arbitrary point on the first electrode plate 111 can be obtained, as shown by Equation 2 below:

$$L = \int_0^\theta r d\theta = \int_0^\theta \left(r_0 + \frac{t}{2\pi}\theta\right) d\theta = r_0\theta + \frac{t}{4\pi}\theta^2 \qquad \text{[Equation 2]}$$

If a notch is formed whenever the first electrode plate 111 is wound at a predetermined angle ($\varphi$[rad]), the first non-coated part 111$b$ has the notch for each predetermined distance ($c_n$) from the start point, as given by Equation 3 below:

$$c_n = r_0 n\phi + \frac{t}{4\pi}(n\phi)^2 \qquad \text{[Equation 3]}$$

wherein n is a natural number, for example, a distance between a point at which a first notch is formed and the start point is $c_1$, and a distance between a point at which a second notch is formed and the start point is $c_2$.

Figure 5:
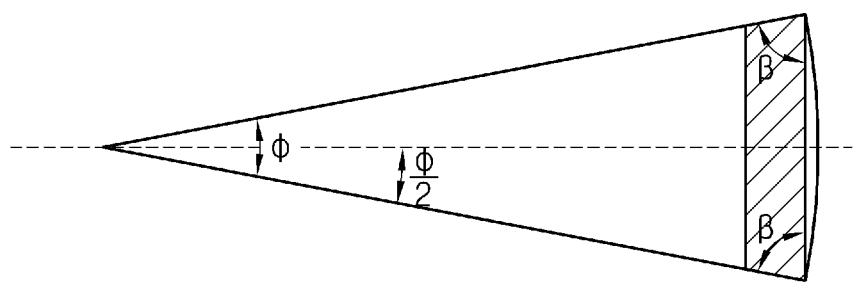
FIG. 5 shows that the shape of a fan having a center angle φ is approximated to an isosceles triangle in FIG. 4.

If the shape of a fan having a center angle $\varphi$ around the winding axis in FIG. 4 is approximated to an isosceles triangle having a vertical angle $\varphi$[rad] in FIG. 4, as shown in FIG. 5, a length ($l_n$) of the base of an electrode tab of each isosceles trapezoid satisfies Equation 4 below:

$$l_n = c_n - c_{n-1} = r_0 n\phi + \frac{t}{4\pi}(n\phi)^2 - r_0(n-1)\phi - \frac{t}{4\pi}[(n-1)\phi]^2 \qquad \text{[Equation 4]}$$

wherein n is a natural number, for example, the length of the base of a first electrode tab from the start point is $l_1$, and the length of the base of a second electrode tab from the start point is $l_2$.

Referring to FIG. 5, it can be seen that $\varphi+2\beta=\pi$ in the isosceles triangle, and referring to FIG. 3, $\alpha+2\beta=\pi$, and thus $\varphi=\alpha$.

As a result, when Equation 4 is adjusted, the length ($l_n$) of the base of the electrode tab of each isosceles trapezoid may be expressed by Equation 5 below:

$$l_n = r_0\alpha + \frac{t\alpha^2}{4\pi}(2n-1) \qquad \text{[Equation 5]}$$

In addition, a height of the electrode tab of each isosceles trapezoid may be substantially equivalent to or slightly larger than t.

Accordingly, when the first non-coated part 111$b$ is bent toward the winding axis, the top surface of the electrode assembly 110 may be covered without any gap.

In particular, when the first non-coated part 111$b$ is bent toward the winding axis, the plurality of electrode tabs may not be randomly overlapped with each other but may have an area substantially corresponding to the top surface of the electrode assembly 110. Therefore, since the flatness can be improved, the first current collecting plate 141 closely comes into surface contact with the first non-coated part 111*b*, and the secondary battery may have the welding strength and resistance are made to be generally uniform, thereby improving welding quality.

In addition, as shown in FIG. 2, the first electrode plate 111 has an insulation layer 111*c* having a substantially uniform width provided between a part where the first electrode active material 111*a* is coated and the first non-coated part 111*b* along the longitudinal direction of the first electrode plate 111.

The insulation layer 111*c* serves to support the first non-coated part 111*b* under the bent portion thereof. Therefore, when the first non-coated part 111*b* (that is, the electrode tab) is bent and pressed, it is possible to prevent a phenomenon that a top portion of the first electrode plate 111 is improperly deformed, and even if the first electrode plate 111 is deformed, a short circuit between the first electrode plate 111 and the second electrode plate 112 can be prevented at the top portion of the first electrode plate 111.

The second non-coated part may be formed in the same manner as described above.

That is, the second non-coated part also has a V-shaped notch having a specific angle ($\alpha$[rad]) formed at each predetermined position along the longitudinal direction of the second electrode plate 112, so that electrode tabs of the plurality of isosceles trapezoidal electrode tabs are continuously arranged adjacent to one another in parallel.

Here, a distance ($c_n$) between a point at which an nth notch is formed and a start point of the second non-coated part, which is closest to the winding axis satisfies Equation 6 below:

$$c_n = r_0 n\alpha + \frac{t}{4\pi}(n\alpha)^2 \quad \text{[Equation 6]}$$

A length ($l_n$) of the base of the nth electrode tab from the start point may satisfy Equation 7 below:

$$l_n = r_0\alpha + \frac{t\alpha^2}{4\pi}(2n-1) \quad \text{[Equation 7]}$$

In addition, an insulation layer having a substantially uniform width may be provided between a part where the second electrode active material is coated and the second non-coated part along the longitudinal direction of the second electrode plate 112.

No further repeated description regarding this will be given.

While the foregoing embodiment has been described to practice the secondary battery of the present invention, it will be understood by those of ordinary skill in the art that various changes in form and details may be made therein without departing from the spirit and scope of the present invention as defined by the following claims.

EXPLANATION OF REFERENCE NUMERALS

100: Secondary battery
110: Electrode assembly
111: First electrode plate
111*a*: First electrode active material
111*b*: First non-coated part
111*c*: Insulation layer
112: Second electrode plate
113: Separator
120: Can
130: Cap assembly
131: Cap plate
132: Safety vent
133: Electrode lead
134: Gasket
141: First current collecting plate
142: Second current collecting plate
$c_n$: Distance between a point at which notch is formed and start point
$l_n$: Length ranging from start point to base of nth electrode tab

The invention claimed is:

1. A secondary battery comprising:
   an electrode assembly comprising:
      a first electrode plate coated with a first electrode active material and having a first non-coated part along an upper end thereof;
      a second electrode plate coated with a second electrode active material and having a second non-coated part along a lower end thereof; and
      a separator interposed between the first electrode plate and the second electrode plate, and wound in a jelly roll shape;
   a can accommodating the electrode assembly;
   a cap assembly sealing the can;
   a first current collecting plate electrically connected to the cap assembly and contacting the first non-coated part; and
   a second current collecting plate electrically connected to the can and contacting the second non-coated part,
   wherein the first non-coated part and/or the second non-coated part has a structure in which isosceles trapezoidal electrode tabs are adjacent to one another with respective notches therebetween formed at an angle ($\alpha$) and at intervals from a start point thereof that is closest to a winding axis, such that the first non-coated part and/or the second non-coated part are bent toward the winding axis, and
   wherein respective lengths of the isosceles trapezoidal electrode tabs increase as the electrode tabs get farther away from the winding axis when the electrode assembly is in a wound state.

2. The secondary battery of claim 1, wherein a distance between a point at which an nth notch of the notches is formed and the start point satisfies the following equation:

$$c_n = r_0 n\alpha + \frac{t}{4\pi}(n\alpha)^2$$

wherein $r_0$ is a radius of the start point around the winding axis, and t is an increment of the radius when winding by 360° is performed.

3. The secondary battery of claim 1, wherein a length ($l_n$) of a base of an nth electrode tab of the isosceles trapezoidal electrode tabs from the start point satisfies the following equation:

$$l_n = r_0\alpha + \frac{t\alpha^2}{4\pi}(2n-1)$$

wherein $r_0$ is a radius of the start point around the winding axis, and t is an increment of the radius when winding by 360° is performed.

4. The secondary battery of claim 1, further comprising an insulation layer in at least one of regions between a part where the first electrode active material is coated and the first non-coated part, and between a part where the second electrode active material is coated and the second non-coated part.

5. The secondary battery of claim 4, wherein the insulation layer has a substantially uniform width along a longitudinal direction.

6. The secondary battery of claim 1, wherein the cap assembly comprises a cap plate.

7. The secondary battery of claim 6, further comprising a safety vent between the first current collecting plate and the cap plate.

8. The secondary battery of claim 6, further comprising a gasket between the can and the cap plate.

9. The secondary battery of claim 1, wherein the cap assembly comprises a cap plate, a safety vent, and a gasket.

10. The secondary battery of claim 9, wherein the cap plate comprises an upwardly protruding terminal portion.

11. The secondary battery of claim 10, wherein the cap plate defines a hole for discharging gas around the upwardly protruding terminal portion.

12. The secondary battery of claim 1, wherein respective heights of the isosceles trapezoidal electrode tabs are substantially equal.

13. The secondary battery of claim 3, wherein respective heights of the isosceles trapezoidal electrode tabs are substantially equivalent to or slightly larger than t.

14. The secondary battery of claim 1, wherein a combined area of the isosceles trapezoidal electrode tabs is substantially equal to an area of a top of the electrode assembly when the electrode assembly is in a wound state.

15. The secondary battery of claim 13, wherein when the electrode tabs are folded towards the winding axis, the electrode tabs substantially cover a top of the electrode assembly.

16. A secondary battery comprising:
an electrode assembly comprising:
a first electrode plate coated with a first electrode active material and having a first non-coated part along an upper end thereof;
a second electrode plate coated with a second electrode active material and having a second non-coated part along a lower end thereof; and
a separator between the first electrode plate and the second electrode plate, and wound in a jelly roll shape;
a can accommodating the electrode assembly;
a cap assembly sealing the can, and comprising a cap plate, a safety vent, and a gasket;
a first current collecting plate electrically connected to the cap assembly and contacting the first non-coated part; and
a second current collecting plate electrically connected to the can and contacting the second non-coated part,
wherein the first non-coated part and/or the second non-coated part has a structure in which isosceles trapezoidal electrode tabs are adjacent to one another with respective notches therebetween having an angle ($\alpha$) at intervals from a start point thereof that is closest to a winding axis, such that the first non-coated part and/or the second non-coated part are bent toward the winding axis,
wherein respective lengths of the isosceles trapezoidal electrode tabs increase as the electrode tabs get farther away from the winding axis when the electrode assembly is in a wound state,
wherein the safety vent is between the first current collecting plate and the cap plate,
wherein the gasket is between the can and the cap plate,
wherein the cap plate comprises an upwardly protruding terminal portion, and defines a hole for discharging gas around the upwardly protruding terminal portion,
wherein respective heights of the isosceles trapezoidal electrode tabs are substantially equal,
wherein a combined area of the isosceles trapezoidal electrode tabs is substantially equal to an area of a top of the electrode assembly when the electrode assembly is in the wound state, and
wherein, when the electrode tabs are folded towards the winding axis, the electrode tabs substantially cover the top of the electrode assembly.

* * * * *